(12) United States Patent
Chen et al.

(10) Patent No.: US 6,259,741 B1
(45) Date of Patent: Jul. 10, 2001

(54) METHOD OF ARCHITECTURE FOR CONVERTING MPEG-2 4:2:2-PROFILE BITSTREAMS INTO MAIN-PROFILE BITSTREAMS

(75) Inventors: Xuemin Chen; Limin Wang; Ajay Luthra; Robert O. Eifrig, all of San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/252,135

(22) Filed: Feb. 18, 1999

(51) Int. Cl.[7] .................................................. H04N 7/12
(52) U.S. Cl. ................................ 375/240.26; 375/240.29
(58) Field of Search ........................ 375/240.03, 240.21, 375/240.25, 240.26, 240.29; 348/405.1, 419.1, 424.1, 425.1, 425.3, 441, 449, 453; 382/235, 234, 238, 244; 386/109, 111

(56) References Cited

U.S. PATENT DOCUMENTS

| | | |
|---|---|---|
| 5,218,435 | 6/1993 | Lim et al. ........................ 375/240.16 |
| 5,260,808 | 11/1993 | Fujii ....................................... 358/458 |
| 5,544,266 * | 8/1996 | Koppelmans et al. ................ 382/238 |
| 5,808,570 * | 9/1998 | Bakhmutsky ........................... 341/65 |
| 6,141,447 * | 10/2000 | Linzer et al. ......................... 382/236 |
| 6,144,698 * | 11/2000 | Poon et al. ........................... 375/240 |

FOREIGN PATENT DOCUMENTS

| | | | |
|---|---|---|---|
| 0 692 915 | 1/1996 | (EP) ................................ H04N/9/64 |
| 0 805 592 | 11/1997 | (EP) ................................ H04N/7/95 |
| WO 97/47128 | 4/1997 | (WO) . | |
| WO 99/51036 | 10/1999 | (WO) .............................. H04N/1/50 |

OTHER PUBLICATIONS

Horne et al, "Study of the Characteristics of the MPEG2 4:2:2 Profile–Application of MPEG2 in Studio Environment", IEEE Trans. on Circuits and Systems for Video Technology, vol. 6, No. 3, Jun. 1996.*

Van Dusen et al, "MPEG2 4:2:2@ML–From Concept to an Implementation", International Broadcasting Convention, Publication No. 428, IEEE Sep. 1996.*

Assuncao et al, "A Frequency–Domain Video Transcoder for Dynamic Bit–Rate Reduction of MPEG–2 Bit Streams", IEEE Trans. on Circuits and Systems for Video Technology, vol. 8, No. 8, Dec. 1998.*

ISO/IEC JTC1/SC29/WG11N1159, ISO/IEC 13818–2 Amendment 2, Jan. 1996, pp. 1–24.

ISO/IEC JTC1/SC29/WG11N2125, ISO/IEC 13818–2 Proposed Draft Amendment 5, Mar. 1998, pp. 1–5.

Björk, Niklas et al., "TRANSCODER ARCHITECTURES FOR VIDEO CODING,"IEEE Transactions on Consumer Electronics, vol. 44, No. 1, Feb. 1998, pp. 88–98.

* cited by examiner

*Primary Examiner*—Vu Le
(74) *Attorney, Agent, or Firm*—Barry R. Lipsitz

(57) ABSTRACT

A system for converting the color format of a digital video bitstream. The system accounts for the allowable formats of the pre- and-post-conversion bitstreams, including quantizer precision level, and whether luma and chroma data have separate quantization matrices, or share a common quantization matrix. In a particular implementation, an MPEG-2 4:2:2 P bitstream having a color format of 4:2:2 or 4:2:0 is converted to a MP bitstream having a color format of 4:2:0. Coding efficiencies are achieved by using the luma quantization matrix to re-quantize the chroma data, and re-using luma motion vectors for performing motion compensation of the chroma data. Further efficiencies can be achieved by representing a 4:2:2 reference picture in a 4:2:0 format for converting inter coded frames, and changing the position of a pixel downsizing filter and clip function. Adjustment of the quantization precision is provided as required. A transcoding function can also be achieved.

26 Claims, 6 Drawing Sheets

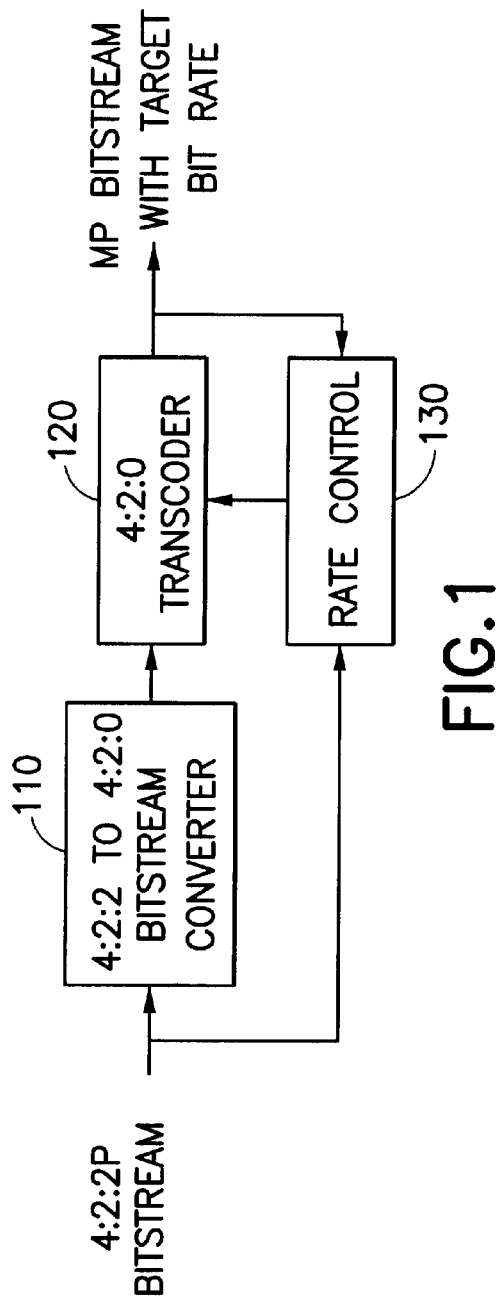
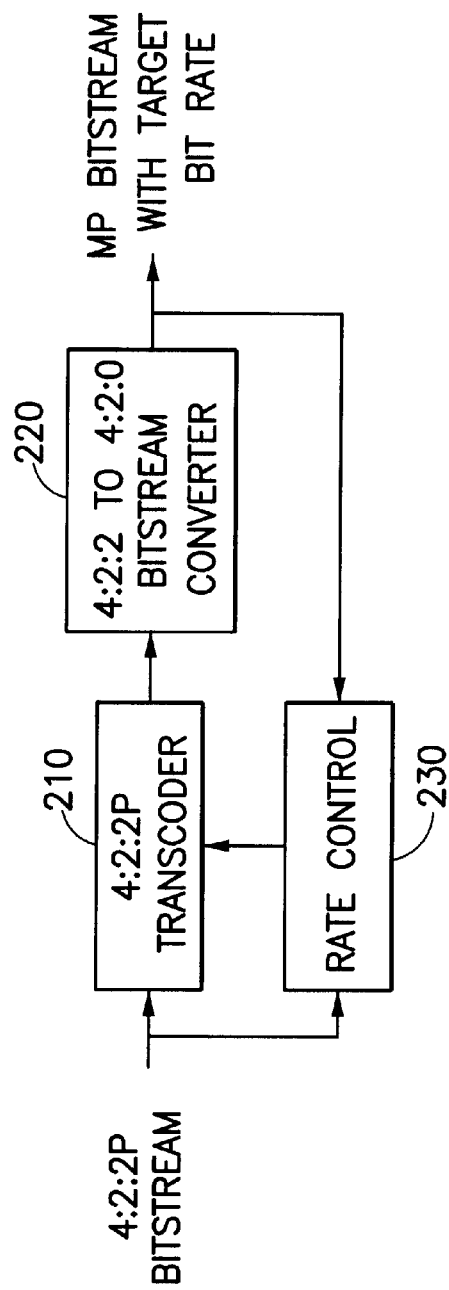

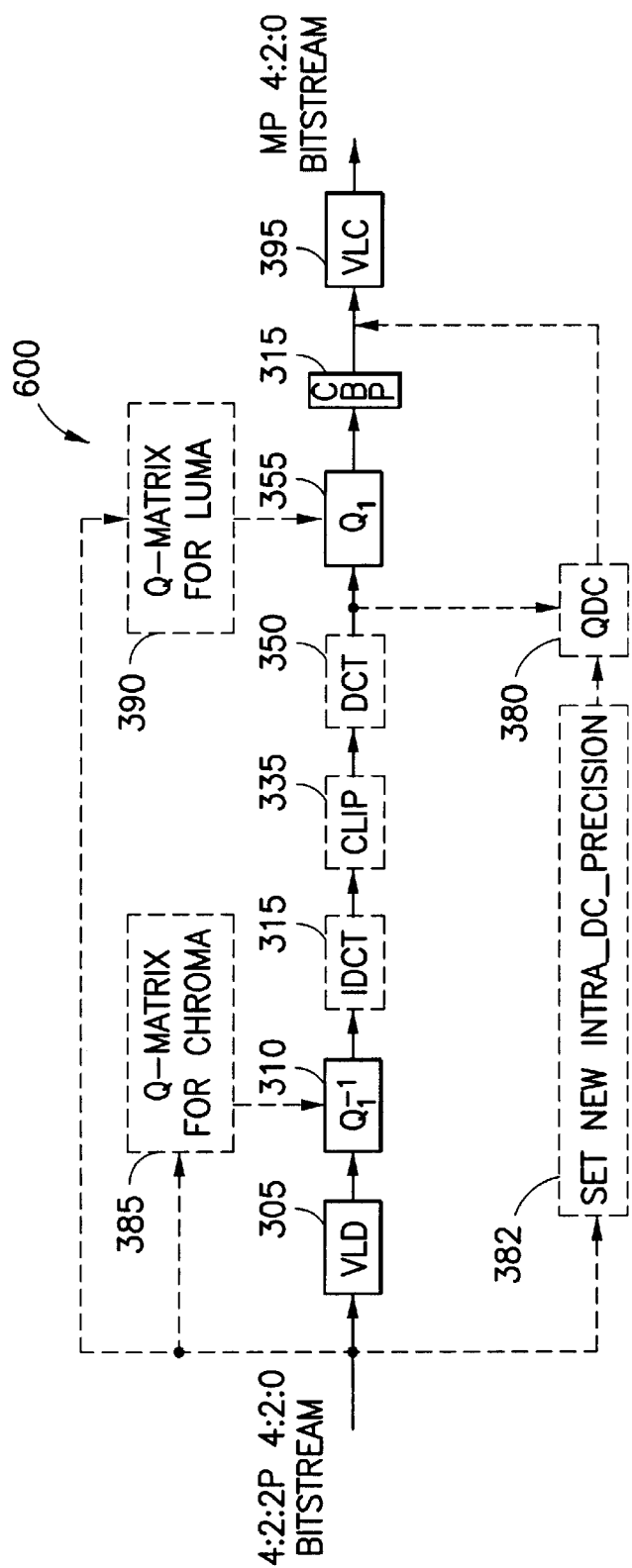
FIG.6
FIG.7

METHOD OF ARCHITECTURE FOR CONVERTING MPEG-2 4:2:2-PROFILE BITSTREAMS INTO MAIN-PROFILE BITSTREAMS

BACKGROUND OF THE INVENTION

The present invention provides a system for converting the format of a digital video bitstream. The invention is particularly suitable for converting a MPEG-2 digital video data from a 4:2:2 Profile format to a Main Profile format.

The following acronyms and abbreviations are used:

4:2:2P—4:2:2 Profile;
CBP—Coded Block Pattern;
DCT—Discrete Cosine Transform;
HDTV—High Definition Television;
HL—High Level;
IDCT—Inverse DCT;
MB—Macroblock
MC—Motion Compensation;
ML—Main Level;
MP—Main Profile;
MV—Motion Vector;
QDC—Quantized Direct Current;
SDTV—Standard Definition Television;
VBV—Video Buffer Verifier;
VLC—Variable Length Coder; and
VLD—Variable Length Decoder.

A video image is defined by a number of picture elements, also known as pixels or pels. A pixel, which is the smallest element of a raster scan line in the image, has an associated color space. For example, in a YCrCb color space, Y is a luminance component, and Cr and Cb are color difference components. Various sampling formats have been defined, including 4:4:4, 4:2:2, and 4:2:0. For example, with a 4:2:2 format, a macroblock has four 8×8 Y blocks, two 8×8 Cr blocks and two 8×8 Cb blocks. With this format, the sampling frequencies for the Y, Cr and Cb components may be 13.5 MHz, 6.75 MHz and 6.75 MHz, respectively.

With a 4:2:0 format, a macroblock has four 8×8 Y blocks, one 8×8 Cr block and one 8×8 Cb block.

Moreover, various digital video coding standards have been developed for coding video data including, in particular, the MPEG-2 standard, defined in ISO/IEC 13818-2 MPEG-2 Video (ITU-R H.262), 1995.

MPEG-2 designates several sets of constrained parameters using a two-dimensional ranking order. One of the dimensions, called the "profile" series, specifies the coding features supported. The other dimension, called "level", specifies the picture resolutions, bit rates, and so forth. that can be accommodated. The most important profile-level combination is called Main Profile at Main Level, or MP@ML. MP@ML supports a 4:2:0 color subsampling ratio.

In addition to the Main Profile, other profiles exist. For example, the Simple Profile is similar to the Main Profile but has no B-pictures. The SNR Scaleable Profile adds SNR scalability to the Main Profile. The Spatially Scaleable Profile adds spatial scalability to the SNR Scaleable Profile. The High Profile adds a 4:2:2 color format capability to the Spatially Scaleable Profile.

The Main Level is defined for CCIR 601 video, while the Simple Level is defined for Standard Intermediate Format (SIF) video. Additionally, two higher levels for HDTV are the High-1440 Level, with a maximum of 1440 pixels per line, and the High Level, with a maximum of 1920 pixels per line.

Furthermore, a 4:2:2 profile, also referred to as 4:2:2 P, has recently been developed, which accommodates both 4:2:2 and 4:2:0 color formats. See ISO/IEC 13818-2 Amendment 2, MPEG-2 4:2:2 Profile at Main Level, January 1996; ANSI/SMPTE 308 M, SMPTE STANDARD for television—MPEG-2 4:2:2 Profile at High Level, 1997; and ISO/IEC 13818-2 Proposed Draft Amendment 5, 4:2:2 Profile at High Level, March 1998, each of which is incorporated herein by reference.

The 4:2:2 profile is intended for professional video applications where ease of editing of compressed video and multiple-generation encoding/decoding of video are important requirements. The primary applications targeted by this profile are:

Storage

Editing and creation of visual effects

Video tape or disk recording for professional use (contribution quality)

Studio post-production of high-quality video sequences

Efficient transmission for storage and distribution of contribution quality video 4:2:2 P can provide higher video quality, better chroma resolution and allows a higher bit-rate (at Main Level(ML), up to 50 Mbit/s) than Main Profile (e.g., MP@ML). In particular, 4:2:2 P provides separate quantization matrices for luma and chroma data. In studio applications, very high quality video and ITU-R 601 4:2:2 video format are often needed for ease of chroma keying and other special effects. Because of the requirement of ease of editing, more frequent INTRA pictures are necessary, which also results in high coding bit-rates. 4:2:2 P permits all I-picture encoding. This enables fast recovery from transmission errors and can simplify editing applications.

Even the 4:2:2 P with a 4:2:0 color format can provide a better quality image than MP with the same color format since 4:2:2 P allows greater quantization precision. 4:2:2 P further allows the high bit rates required to maintain high quality while using only I-picture coding. 4:2:2 P also allows the use of P- and B-picture coding types, which can further improve quality or reduce bit rate for the same quality.

Furthermore, in a typical TV broadcast chain, video goes through multiple generations of encode/decode as local TV stations add local programming information and commercials to video before it gets distributed to consumers for reception at their homes, e.g., via a cable television network. Moreover, with analog TV, multiple generations of encode/decode can result in significant picture quality losses. On the other hand, 4:2:2 P can preserve high quality after multiple generations of encoding/decoding. In the case of multiple generations without picture manipulation or change in picture coding type between generations, the quality from the 4:2:2 P coder remains nearly constant after the first generation. Use of picture manipulation or change in picture coding type between generations causes some degradation in quality. Nevertheless, the resulting quality is acceptable for a broad range of applications.

TV studios typically produce "contribution quality" video, which usually is ITU-R 601 source video, or 4:2:2 P@ML (or 4:2:2 P@HL) compressed video. This video is then encoded and transmitted as "distribution quality" TV. Digital television and HDTV in North America have adopted MPEG-2 MP@ML and MP@HL as their video coding standard. Both MP@ML and MP@HL encode and transmit only 4:2:0 format distribution quality video. MP provides a common quantization matrix for luma and chroma data. For example, the aggregate data rate for a HDTV system, which includes compressed video, compressed audio, conditional access, and an auxiliary data channel, is around 18 to 20 Mbits/s.

Accordingly, there is a need for an efficient system to convert a 4:2:2 P pre-compressed contribution quality bitstream to a MP distribution quality bitstream.

To reduce coding complexity, the system should allow reuse of motion vectors, avoid the need to change MB coding types, and use only a single MC unit for processing chroma blocks. The system should further provide the capability to perform a decimate-filtering process on residue chroma-blocks in the INTER coded MBs.

The system should provide a simple approach to replace the chroma quantization matrix during format conversion it if appears in the 4:2:2 P bitstreams.

The system should refine the CBP for chroma blocks.

The system should also provide adjustment of the MPEG DC coefficient precision variable, intra_dc_precision, as required to conform to the coding standard used. For example, the maximum allowed intra_dc_precision level for a MP bitstream is lower than that for a 4:2:2 P bitstream.

The system should provide a combined 4:2:2 to 4:2:0 converter and a normal transcoder to perform 4:2:2 P to MP transcoding with a format conversion.

The system should avoid the need to fully decode the processed bitstream during the format conversion.

The present invention provides a system having the above and other advantages.

SUMMARY OF THE INVENTION

The invention relates to approaches to converting the format of a digital video bitstream, such as for converting a 4:2:2 P pre-compressed contribution quality bitstream to a MP distribution quality bitstream.

A method for converting a pre-conversion bitstream having a first format to a post-conversion bitstream having a second format, includes the steps of: at least partially decompressing the pre-conversion bitstream to recover chroma data therein in a pixel domain, recovering quantization matrix data associated with luma data from the pre-conversion bitstream, and re-compressing data corresponding to the recovered chroma data. The re-compressing includes re-quantizing of the data corresponding to the recovered chroma data according to the recovered luma quantization matrix to provide the post-conversion bitstream.

When the pre-conversion bitstream comprises inter coded images, and the recovered chroma data has a first chroma format that corresponds to the first format of the pre-converted bitstream, the method includes the further steps of: recovering motion vectors associated with the luma data from the pre-conversion bitstream, using the recovered luma motion vectors to perform first motion compensation processing of the recovered chroma data for the inter-coded images, where the first motion compensation processing using the first chroma format, filtering the chroma data after the first motion compensation processing to provide chroma data that has a second chroma format that corresponds to the second format of the post-conversion bitstream, and using the recovered luma motion vectors to perform second motion compensation processing of the chroma data with the second chroma format to provide the data for the re-compressing step.

With the second chroma format, one chroma block is provided for at least every two chroma blocks in the first chroma format (e.g., two blocks for 4:2:2 and one block for 4:2:0).

Data corresponding to the chroma data with the second chroma format provided by the filtering step is transformed from a pixel domain to a transform domain, then quantized, then inverse quantized and then inverse transformed to provide data for the second motion compensation processing.

The method may include the further steps of recovering a first quantization precision level from the pre-conversion bitstream, and if the first quantization precision level is greater than a maximum allowed precision level of the second format of the post-conversion bitstream: (i) lowering the first quantization precision level, (ii) recovering DC luma transform data from the pre-conversion bitstream, and (iii) re-quantizing data corresponding to the recovered DC luma transform data according to the lowered quantization precision level.

Alternatively, when the pre-conversion bitstream comprises inter coded images, and the recovered chroma data has a first chroma format that corresponds to the first format of the pre-converted bitstream, the method includes the further steps of: filtering the recovered chroma data to provide residue chroma data that has a second chroma format that corresponds to the second format of the post-conversion bitstream, recovering motion vectors associated with the luma data from the pre-conversion bitstream, and using the recovered luma motion vectors to perform motion compensation processing of data corresponding to the residue chroma data for the inter-coded images to provide the data for the re-compressing step. Here, the motion compensation processing uses the second chroma format, so only one motion compensator is required. The errors introduced are generally not problematic since chroma errors are less detectable than luma errors in the resulting image.

The first format may be the MPEG 4:2:2 Profile format, and the second format may be the MPEG Main Profile format.

A coded block pattern of the pre-conversion bitstream may be modified for use in the post-conversion bitstream.

Moreover, the pre-conversion bitstream and the post-conversion bitstream may use the same macroblock coding type.

Furthermore, the re-quantization step may be responsive to a rate control signal for setting a bit rate of the post-conversion bitstream.

The recovered luma quantization matrix may be modified to improve coding efficiency of the post-conversion bitstream.

A corresponding apparatus is also presented.

BRIEF DESCRIPTION OF THE DRAWINGS

FIG. 1 illustrates a first approach to 4:2:2 P to MP bitstream converting in accordance with the present invention.

FIG. 2 illustrates a second approach to 4:2:2 P to MP bitstream converting in accordance with the present invention.

FIG. 6 illustrates a chrominance-block bitstream conversion from a 4:2:2 P 4:2:0 bitstream to a MP 4:2:0 bitstream in accordance with the present invention.

FIG. 7 illustrates a luminance-block bitstream conversion from a 4:2:2 P 4:2:2 or 4:2:0 bitstream to a MP 4:2:0 bitstream when intra_dc_precision=11 in accordance with the present invention.

DETAILED DESCRIPTION OF THE INVENTION

Figure 3:
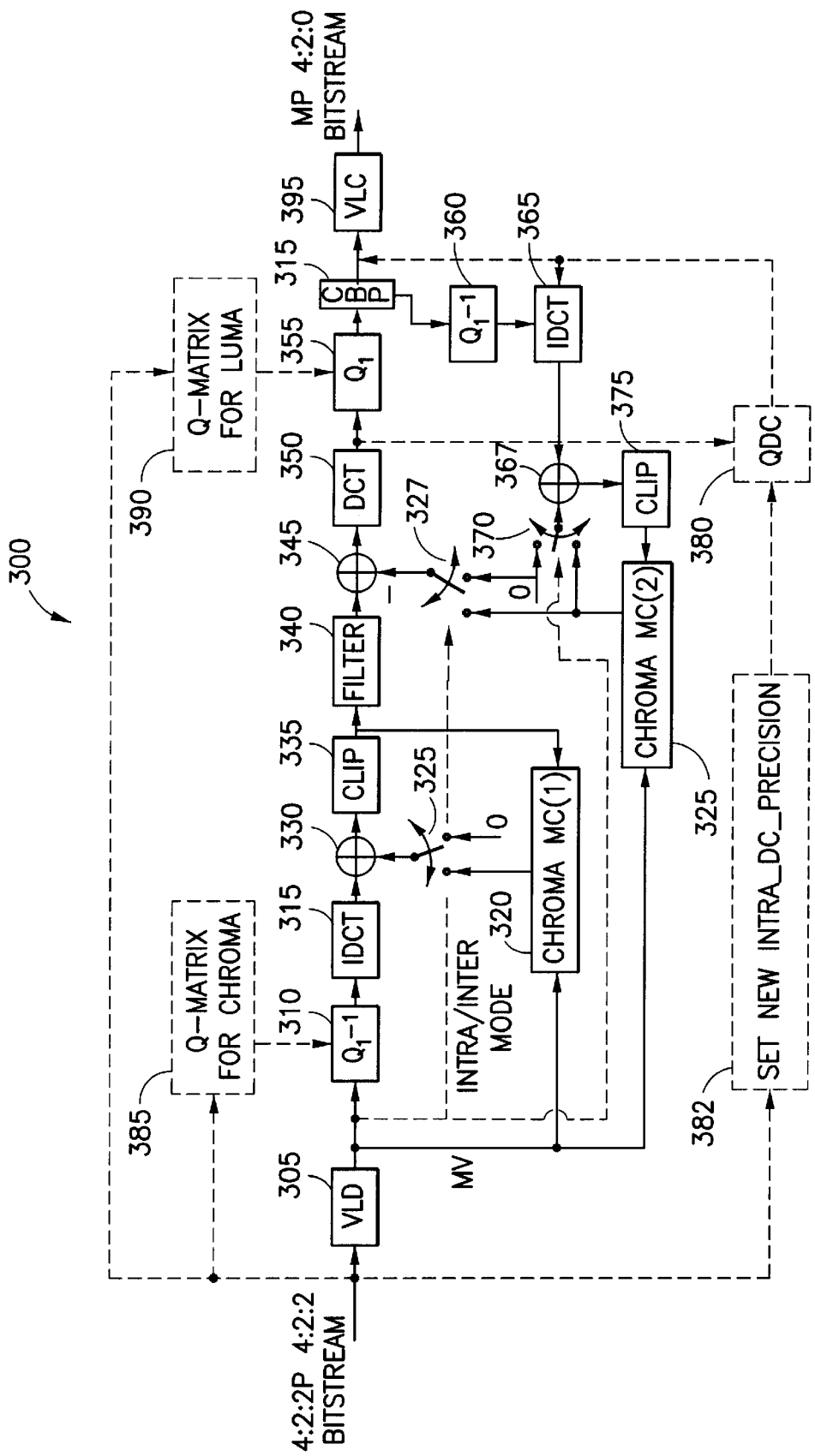
FIG. 3 illustrates chrominance block bitstream conversion from a 4:2:2 P 4:2:2 bitstream to a MP 4:2:0 bitstream in accordance with the present invention.

The invention relates to approaches to converting a 4:2:2 P pre-compressed contribution quality bitstream to a MP distribution quality bitstream.

In general, a MPEG-2 transcoder is an instrument which converts a pre-compressed MPEG-2 bit stream into another MPEG-2 bit stream at a new rate. A transcoder for converting an MPEG-2 4:2:2 P@ML (or 4:2:2 P@HL) bit stream to MP@ML (or MP@HL) bit stream can be a cascaded 4:2:2 P (@ML or @HL) or MP transcoder and a 4:2:2 to 4:2:0 converter with rate-control. The following transcoding cases are of particular interest: 4:2:2 P@ML to MP@ML, 4:2:2 P@HL to MP@ML, and 4:2:2 P@HL to MP@HL. Transcoding from HL to ML is very common, e.g., from HDTV format to SDTV format. However, transcoding from ML to HL generally is not of interest since it results in a higher bit rate but does not improve picture quality. If one wants a higher resolution from an ML bitstream, the bitstream can be decoded, and post-processing interpolation can be used to enlarge the image.

There are two different approaches, as shown in FIGS. 1 and 2, to achieve 4:2:2 P to MP transcoding.

In the Figures, like-numbered elements correspond to one another.

FIG. 1 illustrates a first approach to 4:2:2 P to MP bitstream transcoding in accordance with the present invention. Here, when a pre-compressed 4:2:2 P bitstream is input, a 4:2:2 to 4:2:0 bitstream converter 110 partially decodes the 4:2:2 bitstream and re-assemble the results to provide a MP bitstream. A conventional 4:2:0 transcoder 120 is then used to generate a new MP compressed bit stream at a new rate. A rate control function 130 controls the rate of the bitstream that is output by the transcoder 120.

FIG. 2 illustrates a second approach to 4:2:2 P to MP bitstream transcoding in accordance with the present invention. Here, when a pre-compressed 4:2:2 P bitstream is input, a 4:2:2 P transcoder 210 is cascaded with a 4:2:2 to 4:2:0 bitstream converter 220 to generate a MP compressed bitstream at a new rate, under the control of a rate control function 230.

With rate control, special attention has to be paid to the maximum number of bits in each macroblock since the maximum number of bits in a macroblock for 4:2:0 chroma format is up-bounded by 4,608 bits, but is unconstrained for a macroblock for the 4:2:2 P 4:2:2 chroma format.

The present invention focuses on the 4:2:2 to 4:2:0 bitstream converter 110, 220.

The 4:2:2 P@ML format is an extension to the MP@ML format in many ways. The key ML features are summarized in Table 1. Similarly, 4:2:2 P@HL is an extension to MP@HL in many ways. The key HL features are summarized in Table 2.

TABLE 1

4:2:2P@ML and MP@ML

| | 4:2:2P@ML | MP@ML |
|---|---|---|
| Chroma format | 4:2:2 or 4:2:0 | 4:2:0 |
| Profile and level identification | 10000101 | 1001000 |
| Repeat first field | Constrained as MP@ML, with two additional constraints for pictures with more than 512 lines: B pictures shall have no repeat first fields if the frame rate is 25 Hz. | Table 8-7 in MPEG-2 Video |
| Intra DC precision | 8,9,10 or 11 bits | 8,9 or 10 bits |
| Upper bounds for sample density | 720 samples/lines, 608 lines/frame, 30 frame/sec. (512 lines/frame for 30 Hz, 608 lines/frame for 25 Hz.). | 720 samples/line, 576 lines/frame, 30 frames/sec |
| Upper bound for luma sample rate | 11,059,200 pixels/sec. | 10,368,000 pixels/sec. |
| Upper bound for bit rate | 50 MB/sec. | 15 Mbits/sec. |
| Maximum VBV Buffer size | 9,437,184 bits | 1,835,008 bits |
| Quantization Tables | Separate luminance and chrominance quantization tables | The sample table for both luminance and chrominance |
| Maximum number of bits in a macroblock | unconstrained for 4:2:2, 4,608 for 4:2:0 | 4,608 |

TABLE 2

4:2:2P@HL and MP@HL

| | 4:2:2P@HL | MP@HL |
|---|---|---|
| Chroma format | 4:2:2 or 4:2:0 | 4:2:0 |
| Profile and level identification | 10000010 | 1000100 |
| Repeat first field | Constrained as MP@HL, with two additional constraints for pictures with more than 1152 lines: B pictures shall have no repeated first fields if the frame rate is 25 Hz. | Table 8-7 in MPEG-2 Video |
| Intra DC precision | 8,9,10 or 11 bits | 8,9 or 10 bits |
| Upper bounds for sample density | 1920 samples/line, 1152 lines/frame, 60 Frame/sec. | 1920 samples/line, 1152 lines/frame, 60 Frames/sec. |
| Upper bound for luma sample rate | 62,668,800 pixels/sec. | 62,668,800 pixels/sec. |
| Upper bound for bit rate | 300 MB/sec. | 80 Mbits/sec. |
| Maximum VBV Buffer size | 47,185,920 bits | 9,781,248 bits |
| Quantization Tables | Separate luminance and chrominance quantization tables | The sample table for both luminance and chrominance |
| Maximum number of bits in a macroblock | unconstrained 4,608 for 4:2:0 | 4,608 |

Without changing the coded macroblock type in the 4:2:2 P-bitstreams, the differences between 4:2:2 P and MP given in Tables 1 and 2 result in the possible changes to syntax listed in Table 3.

Note that the macroblock type, given by a VLC coded term macroblock_type, indicates a number of different characteristics of a macroblock, including:

whether quant_scale_code is present in the bitstream (macroblock_quant), whether forward or backward motion compensation is used (macroblock_motion_forward and macroblock_motion_backward, respectively), whether coded_block_pattern is present in the bitstream (macroblock_pattern), whether the macroblock is intra-coded (macroblock_intra), whether spatial_temporal_weight_code is present in the bitstream (spatial_temporal_weight_code_flag), and the permitted spatial_temporal_weight_classes.

TABLE 3

Possible Syntax Changes

| Elements of syntax change | Syntax Change Action |
|---|---|
| A | In Sequence_header( ), re-set vbv_buffer_size_value=1,835,008@ML (9,781,248@HL) and re-set bit_rate_value. In Sequence_extension( ), re-set profile_and_level_indication=1 100 1000@ML (0 100 0100@HL). In Picture_header( ), re-compute and re-set_vbv_delay. |
| B | In Sequence_extension( ), re-set chroma_format="4:2:0" |
| C | In Picture_coding_extension( ), re-set intra_dc_precision=8,9, or 10(programmable). Set chroma_420_type=progressive_frame; |
| D | In Quant_Matrix_extension( ), re-set load-chroma_quantiser_matrix=0 and remove chroma_intra_quantiser_matrix[64]. |
| E | In Quant_matrix_extension( ), re-set load_chroma_non_intra_quantiser_matrix=0 and remove chroma_non_intra_quantiser_matrix[64]. |
| F | Change Coded Block Patterns for each marcoblock. |

The syntax change actions disclosed in Table 3 can be understood further with reference to the syntaxes for "Sequence header", "Sequence extension", "Picture Header", "Picture coding extension", and "Quant matrix extension", disclosed in the MPEG-2 standard.

Note that if the original intra_dc precision=11 bits, it will be re-set to 8,9, or 10-bits for compatibility with the MP (see Tables 1 and 2).

The MPEG parameter intra_dc_precision is 2-bit integer defined to have the binary value 00, 01, 10 or 11 to designate a precision of 8, 9, 10 or 11 bits, respectively. The parameter intra_dc_precision indicates values for the multiplier, intra_dc_mult, used for inverse quantizing of DC coefficients of intra coded blocks. Namely, intra_dc_mult=8, 4, 2 or 1 for intra dc precision values of 00, 01, 10 or 11, respectively.

Generally, for inverse quantization, a two-dimensional array of coefficients, QF[v] [u], is inverse quantized to produce the reconstructed DCT coefficients. This process is essentially a multiplication by the quantizer step size. The quantizer step size is modified by two mechanisms. Namely, a weighting matrix is used to modify the step size within a block, and a scale factor is used so that the step size can be modified at the cost of only a few bits (as compared to encoding an entire new weighting matrix).

Appropriate inverse quantization arithmetic is performed on the transform coefficients in the bitstream to be converted using quantiser_scale_code, an unsigned, non-zero integer in the range 1 to 31 that indicates the quantisation scale factor, and weighting matrices W[w] [v] [u]. The resulting coefficients, F''[v] [u], are saturated to yield F'[v] [u], and then a mismatch control operation is performed to give the final reconstructed DCT coefficients, F[v] [u].

Two weighting matrices are used for 4:2:0 data —one for intra macroblocks (luma and chroma), and the other for non-intra macroblocks (luma and chroma). For 4:2:2 data, four matrices are used (intra luma, intra chroma, non-intra luma, and non-intra chroma). Thus, different matrices can be used for luminance and chrominance data. Each matrix has a default set of values which may be overwritten by downloading a user-defined matrix.

For the weighting matrices W[w] [v] [u], w takes the values 0 to 3 indicating which of the matrices is being used. Table 4 summarizes the rules governing the selection of w.

TABLE 4

| | Selection of w | | | |
|---|---|---|---|---|
| | 4:2:0 | | 4:2:2 | |
| | luma | chroma | luma | chroma |
| intra blocks (macroblock_intra = 1) | 0 | 0 | 0 | 2 |
| non-intra blocks (macroblock_intra = 0) | 1 | 1 | 1 | 3 |

For intra blocks, the DC value of a two-dimensional array of quantized DCT transform coefficients, QF[0] [0], is treated differently than the AC values. The DC value is inverse quantized to produce the DCT transform DC coefficient array value F''[0] [0], according to the relationship: F''[0] [0]=intra_dc_mult×QF[0] [0].

Moreover, vbv_delay is re-computed from vbv_delay (n)=$B_d(n)/R$, where $B_d(n)$ is the decoder (VBV) buffer fullness just before decoding picture n, and R is the bit rate. In general, the vbv_delay and vbv_buffer_size re-setting require a quantization feedback loop to avoid over- or under-flow of the VBV buffer and the actual rate buffer.

The new coded block pattern (CBP) for the chroma block of a MB in the MP-bitstream is determined by the re-quantized chrominance data. The CBP indicates the number of coded blocks for each macroblock, e.g., eight coded blocks for 4:2:2 color format, or six coded blocks for 4:2:0 color format. For example, for a 4:2:2 to 4:2:0 conversion, syntax change F may involve changing the CBP to indicate the presence of two rather than four chroma blocks. No change to the number of luma blocks (e.g., four blocks) occurs.

To perform the 4:2:2 P to MP conversion, the following key syntax elements need to be parsed from the 4:2:2 P bitstream:

a=(intra_dc_precision==11)?1:0;

b=(chroma_format=="4:2:2")?1:0;

c=(load_chroma_intra_quantiser_matrix==1)?1:0; and d=(load_chroma_non_intra_quantiser_matrix==1) ?1:0.

The above statements use a C-language like pseudo-code syntax. For example, "a=(intra_dc_precision==11)? 1:0"means "a" is assigned the value "1" if "intra_dc_precision==11" is true. Otherwise, "a" is assigned the value "0".

As mentioned, intra_dc_precision must have a value of 8, 9 or 10 for MP. Accordingly, it must be reset if intra_dc_precision==11 (decimal 11, or $11_{10}$).

The term chroma_format is a two-bit integer indicating the chrominance format of the bitstream to be converted. Namely, chroma_format 01 (binary) indicates a 4:2:0 format, and chroma_format=10 indicates a 4:2:2 format. Recall that the 4:2:2 P accommodates both the 4:2:2 color format (b=1) and 4:2:0 color format (b=0). The 4:2:0 format of 4:2:2 P is also an important case. It differs from ML even though both of them have the same resolution since, with 4:2:2 P, both luma and chroma can have different quantization matrices. In contrast, with ML, both luma and chroma use the same quantization matrix. Experiments show that coding with the separate luma and chroma matrices can provide a better quality image.

The term load_chroma_intra_quantiser_matrix is a one-bit flag which is set to "1" if chroma_intra_quantiser_matrix follows. If it is set to "0", there is no change in the values that shall be used. If chroma_format is "14:2:0" (i.e., 10), the flag takes the value "0".

The term chroma_intra_quantiser_matrix is a list of sixty-four, non-zero 8-bit unsigned integers used for quantizing intra chroma transform values.

The term load_chroma_non_intra_quantiser_matrix is a one-bit flag which is set to "1" if chroma_non_intra_quantiser_matrix follows. If it is set to "0", there is no change in the values that shall be used. If chroma_format is "4:2:0" (i.e., 01), this flag takes the value "0".

The term chroma_non_intra_quantiser_matrix is a list of sixty-four, non-zero 8-bit unsigned integers used for quantizing non-intra chroma transform values.

Table 5 defines the sixteen possible cases for the conversion process. For example, for case=0, abcd=0000 (i.e., a=0, b=0, c=0 and d=0). For the options to apply a Q-matrix, this is determined for 4:2:2 P to MP transcoding/converting by detecting whether or not the received bitstream has a separate Q-matrix for chroma. If it does, the chroma matrix is replaced by a luma matrix.

TABLE 5

Cases of Syntax Changes and Texture Converting Process

Figure 4:
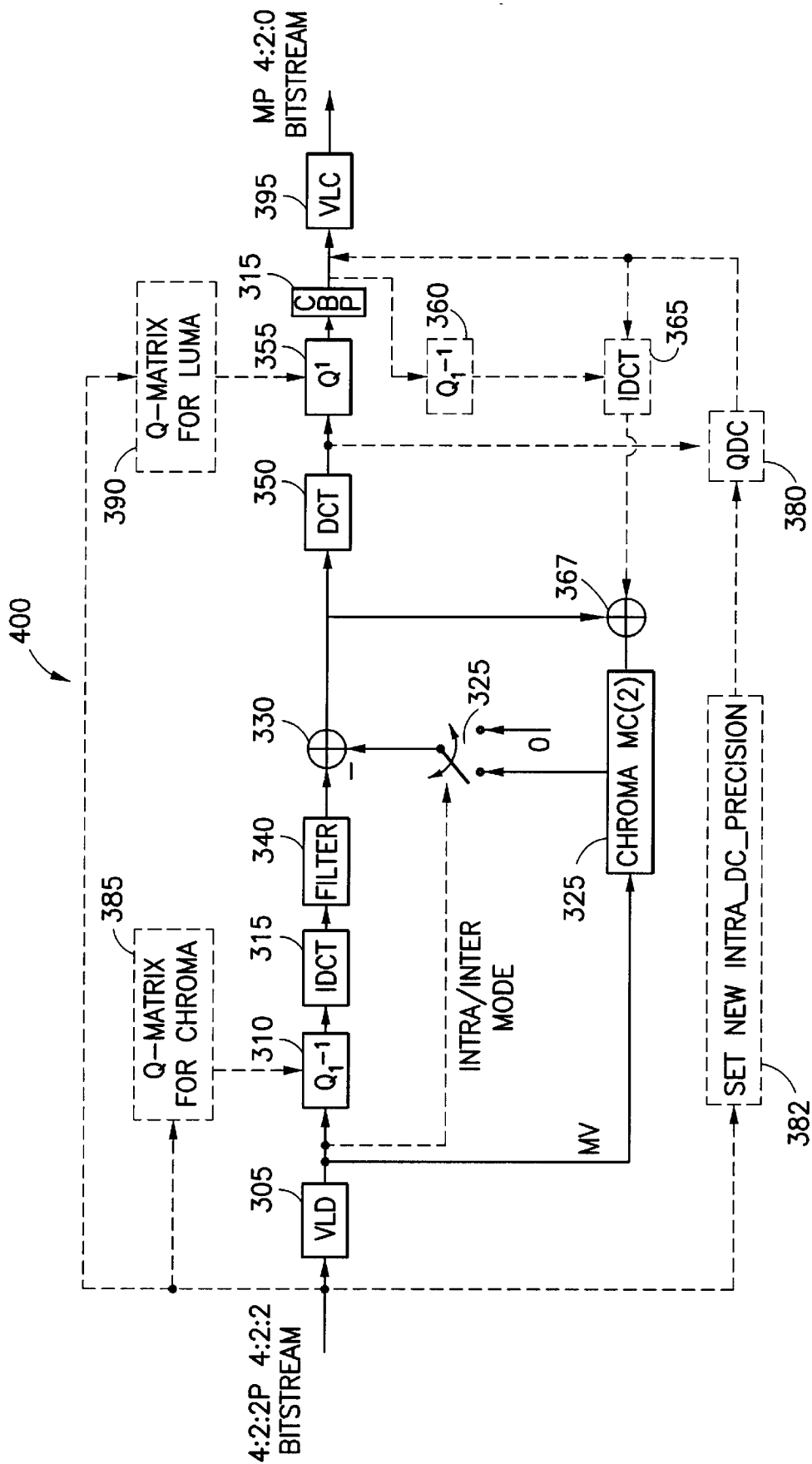
FIG. 4 illustrates a simplified chrominance-block bitstream conversion from a 4:2:2 P 4:2:2 bitstream to a MP 4:2:0 bitstream in accordance with the present invention.
Figure 5:
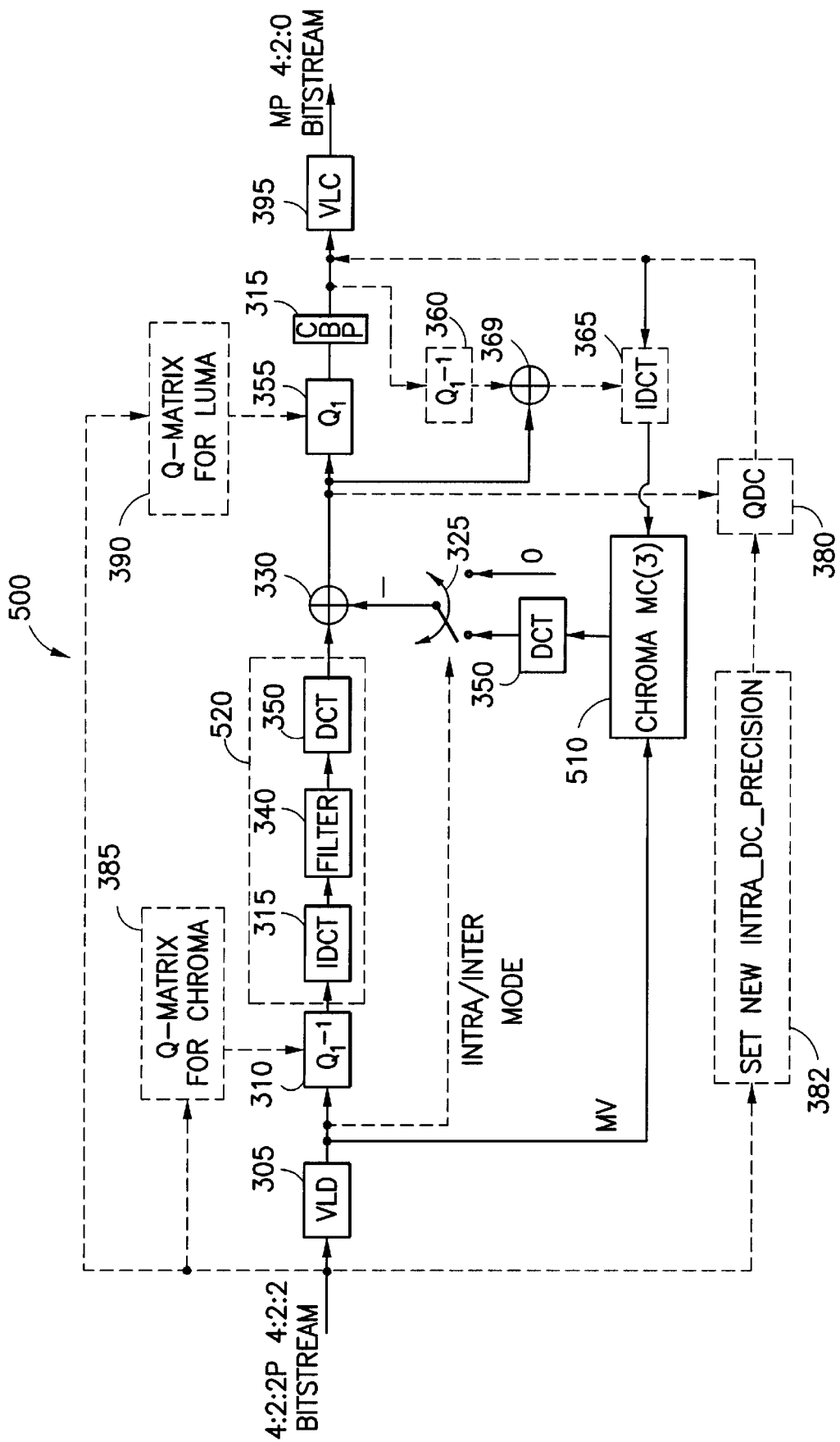
FIG. 5 illustrates an approximated chrominance-block bitstream conversion from a 4:2:2 P 4:2:2 bitstream to a MP 4:2:0 bitstream in accordance with the present invention.

| Case | Syntax changes abcd (see Table 3) | Conversion Process | Options |
|---|---|---|---|
| 0 | 0000 A | vbv_delay and vbv_size changes | |
| 1 | 0001 A, E | FIG. 6 | apply chroma_intra_quantiser_matrix |
| 2 | 0010 A, D | FIG. 6 | apply chroma_non_intra_quantiser_matrix |
| 3 | 0011 A, D, E | FIG. 6 | |
| 4 | 0100 A, B, F | FIGS. 3–5 | |
| 5 | 0101 A, B, E, F | FIGS. 3–5 | apply chroma_intra_quantiser_matrix |
| 6 | 0110 A, B, D, F | FIGS. 3–5 | apply chroma_non_intra_quantiser_matrix |
| 7 | 0111 A, B, D, E, F | FIGS. 3–5 | |
| 8 | 1000 A, C | FIGS. 6, 7 | change intra_dc_precision |
| 9 | 1001 A, C, E | FIGS. 6, 7 | change intra_dc_precision apply chroma_intra_quantiser_matrix |
| 10 | 1010 A, C, D | FIGS. 6, 7 | change intra_dc_precision apply chroma_non_intra_quantiser_matrix |
| 11 | 1011 A, C, D, E | FIGS. 6, 7 | change intra_dc_precision |
| 12 | 1100 A, B, C, F | FIGS. 3–5, 7 | change intra_dc_precision |

TABLE 5-continued

Cases of Syntax Changes and Texture Converting Process

| Case | Syntax changes abcd (see Table 3) | Conversion Process | Options |
|---|---|---|---|
| 13 | 1101 A, B, C, E, F | FIGS. 3–5, 7 | change intra_dc_precision apply chroma_intra_quantiser_matrix |
| 14 | 1110 A, B, C, D, F | FIGS. 3–5, 7 | change intra_dc_precision apply chroma_non_intra_quantiser_matrix |
| 15 | 1111 A, B, C, D, E, F | FIGS. 1, 2, 4, 5, 7 | change intra_dc_precision |

In the texture converting process of a format converter in accordance with the present invention, if intra_dc_precision≠11 bits, only chrominance blocks need to be re-encoded, and no motion-estimation needs to be performed since motion vectors already determined by the luminance blocks are used for re-encoding the chrominance blocks.

For the case of intra_dc_precision=11 bits in a 4:2:2 P bitstream, re-quantization of intra DCT DC luma components is required for the converting process (along with re-quantization of the chroma components). To simplify the converting process, the motion vectors are re-used for the MP bitstreams. Since intra_dc_precision can be re-set to 8, 9, or 10 bits, there is a trade-off between saving bits on quantization of intra-DCT DC components and preserving the accuracy of re-used motion vectors. Therefore, the method to adjust intra_dc_precision is to set the default intra_dc_precision=10 (the highest allowed value for 4:2:0 MP), but it can be over-written to 8 or 9 by the user if desired.

With a higher precision, more bits are needed for transmission. Moreover, both full pel and half pel motion vectors can be re-used. Since at least the half pel MVs are generated from reconstructed pictures, a change in intra dc precision could yield errors (e.g., drift), so minimizing such a change during format conversion could reduce the possible errors for 4:2:2 P to MP transcoding.

If the re-quantization process is applied in the format conversion, intra_dc_precision=8 should be used if it is desired to reduce the number of coded bits.

If the chroma Q-matrices (chroma_intra_quantiser_matrix and/or chroma_non_intra_quantiser_matrix) are applied in the 4:2:2 P-bitstream, the luma Q-matrices (luma_intra_quantiser_matrix and/or luma_non_intra_quantiser_matrix) are applied in the re-quantization of the chrominance blocks in accordance with the present invention.

When the quantization matrices (Q-matrices) are provided at a format converter, they are encoded in the bitstream in a scan order that is converted into the two-dimensional weighting matrix W[w] [u] [v] used in the inverse quantizer as discussed above.

FIG. 3 illustrates chrominance block bitstream conversion from a 4:2:2 P bitstream to a MP bitstream in accordance with the present invention. FIG. 3 provides a complete block diagram for a converter for converting two (possible) chrominance blocks in a 4:2:2 P bitstream (e.g., pre-conversion bitstream) into one chrominance block in a MP bitstream (e.g., post-conversion bitstream). The converter 300 receives a 4:2:2 P bitstream at a VLD function 305, which provides MV data for first and second chroma motion-compensation functions, chroma MC(1) 320 and chroma MC(2), respectively.

Information regarding intra or inter mode status of the received data is provided to switches 325, 327 and 370.

For intra mode data, the switch 325 is activated to pass a null "0" signal to an adder 330, the switch 327 is activated to pass a null "0" signal to an adder 345, and the switch 370 is activated to pass a null "0" signal to an adder 367. For inter mode data, the switch 325 is activated to pass reference image data from the chroma MC(1) function 320 to the adder 330, and the switch 327 is activated to pass reference image data from the chroma MC(2) function 325 to the adder 345.

The chroma MC(1) function 320 is the motion-compensation unit used for the 4:2:2 chroma data, while the chroma MC(2) function 325 is the motion-compensation unit used for 4:2:0 chroma data. In accordance with the present invention, luma MV data is used for motion compensation of the 4:2:0 chroma MP data at the chroma MC(2) function 325 (as well as for motion compensation of the 4:2:2 chroma 4:2:2 P data at the chroma MC(1) function 320). This avoids the need for separate motion estimation processing, including searching in a reference frame, for the 4:2:0 chroma MP data.

The data output from the VLD function 305 includes quantized transform coefficient data from a current image (e.g., frame). This data is provided to an inverse quantizer $Q_1^{-1}$ 310, and to an IDCT function 315. The resulting pixel domain data is provided to the adder 330, and the output from the adder 330 is provided to a clip function 335 to clip the data between minimum and maximum values if necessary, e.g., in the range [0,255].

The clipped data is provided to a filter 340, which includes a field-based vertical filter and a 2:1 vertical downsampling filter. For example, the vertical filter taps may be {−16,0,79,130,79,0,−16} for the top-field, while the filter taps are {1,7,7,1} for the bottom-field. The filtered results are clipped into the range [0,255].

Note that the chroma MC(1) function 320 will modify the MVs received from the VLD 305 using 2:1 downsampling of the horizontal (x) components of the MVs. Similarly, the chroma MC(2) function 325 will modify the MVs received from the VLD 305 using 2:1 downsampling of both the horizontal (x) and vertical (y) components of the MVs.

The clipped data is also provided to the chroma MC(1) function 320.

Note that some function units are embedded in other units. For example, differential encoding and decoding of the quantized DCT DC coefficients are considered to be part of VLC block 395 and VLD block 305, respectively. Inverse quantization $Q_1^{-1}$ at block 310 includes the saturation process with the range [−2048,+2047] for each coefficient from the inverse quantization arithmetic. IDCT block 315 includes the saturation with the range [−256, 255] for each inverse transformed value. The MC blocks, chroma MC(1) 320 and chroma MC(2) 325, include memories for the reference pictures.

A CBP function 315 may be used to change the CBP of the outgoing MP bitstream. The luma Q-matrix function 390 is one factor which could modify the CBP. Other factors are an increase in the re-quantization level, and only one field block in the original (received bitstream) two Cb or Cr blocks of a MB having pixel values.

The filtered current image data, having the 4:2:0 color format, is provided to the adder 345, where either a null signal or reference image data from the chroma MC(2) function is subtracted. At DCT function 350, the data from the adder 345 (comprising the current image 4:2:0 pixel data for an intra coded image, or comprising difference 4:2:0 pixel data corresponding to the difference between the current image and the reference image for an inter coded image) is transformed to DCT coefficients, and quantized at a re-quantizer ($Q_1$) 355.

The re-quantization level $Q_1$ is shown as corresponding to the inverse quantization level $Q_{-1}$. However, the re-quantization level may be adjusted to a different level ($Q_2$), based on a suitable control signal from a rate control function, to provide transcoding of the received bitstream, wherein the MP bitstream is provided at a different rate than the 4:2:2 P bitstream.

Figure 8:
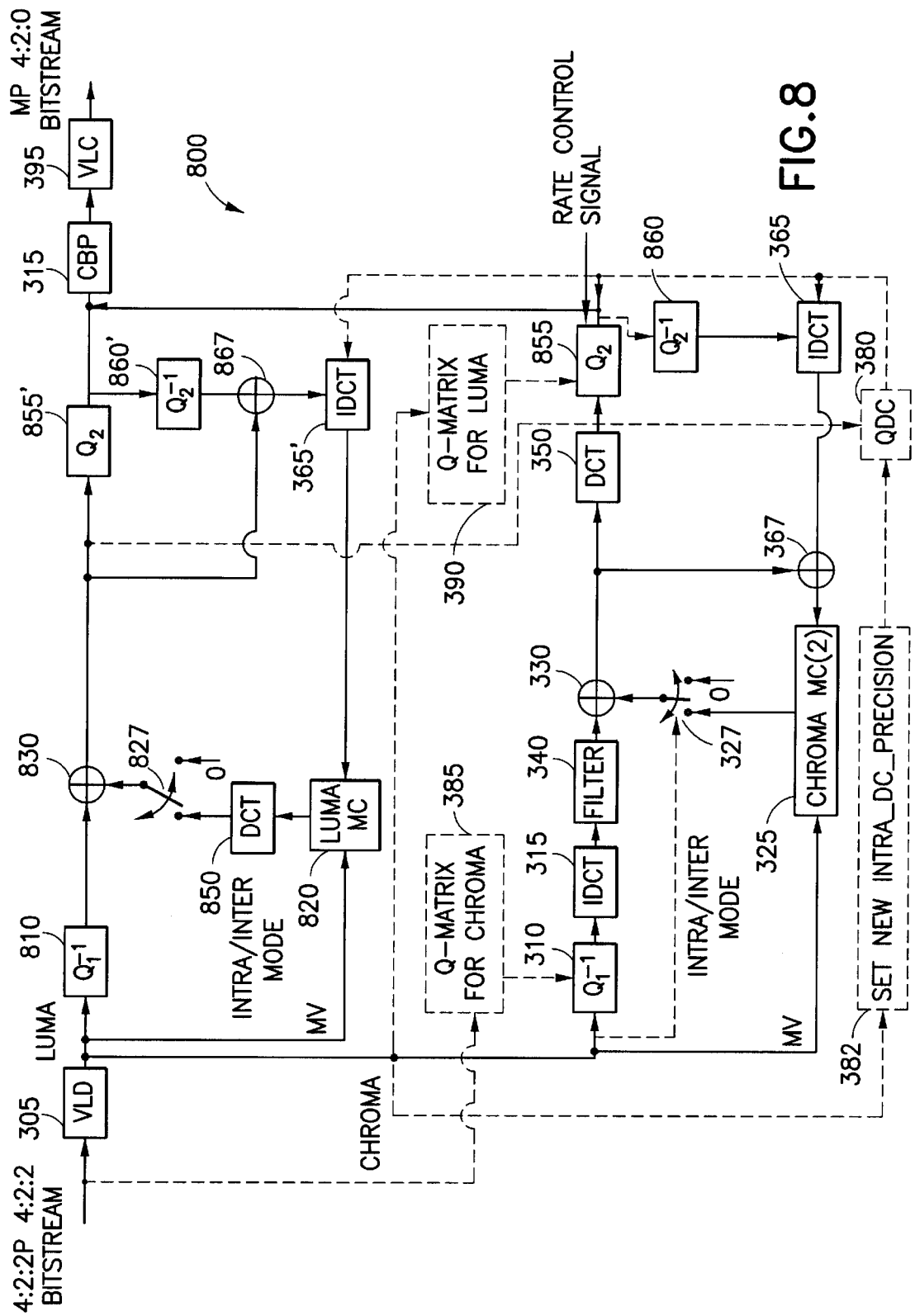
FIG. 8 illustrates a combination of a 4:2:2 to 4:2:0 converter and a transcoder in accordance with the present invention.

See FIG. 8 for a full transcoder implementation.

The quantized data is provide to a VLC function 395 to obtain the MP bitstream for transmission or other processing. For example, a transcoder may be concatenated with the format converter 300.

The quantized data is processed at an inverse quantizer 360 and an IDCT function 365. The recovered current image pixel data is then provided to an adder 367, where it is summed with either a null signal (for intra mode data) or reference image data from the chroma MC(2) function 325 (for inter mode data) according to the switch 370. The switch 370 is responsive to intra/inter mode information provided to it (e.g., from the VLD 305).

The output from the adder 367 is clipped at a clip function 375 and provided to the chroma MC(2) function 325.

In the converter 300, the dotted-line function units and paths are conditional (i.e., are used in some cases). For example, a QDC unit 380 may be used to perform the re-quantization of DC chroma coefficients if requested by a user setting, or if intra_dc_precision=$11_{10}$. Specifically, QDC(8 bits)=DC//8 for intra_dc_precision=8, QDC(9 bits)=DC//4 for intra_dc_precision=9, and QDC(10 bits)= DC//2 for intra_dc_precision=10. "DC" denotes the value of the unquantized DC DCT coefficient. "//" denotes integer division with rounding to the nearest integer. Half-integer values are rounded away from zero.

A function 382 is provided for setting a new intra_dc_ precision level (e.g., 8–10 bits) if required, as discussed previously.

A chroma Q-matrix function 385 recovers the chroma quantization matrix for use by the inverse quantizer 310. A luma Q-matrix function 390 recovers the luma quantization matrix for use by the re-quantizer 355 in re-quantizing the 4:2:0 MP chroma coefficients. Optionally, the luma Q-matrix can be modified for coding reasons, e.g., to improve coding efficiency by adjusting the values in the matrix in a manner that should be apparent to those skilled in the art. The re-quantizer 355 also re-quantizes DC luma coefficients when intra_dc_precision=$11_{10}$.

If no quantization matrix is present in the receives bitstream, a default, such as the default MPEG quantization matrix, may be used. The default matrix may be stored locally at the converter 300, for example.

To balance cost vs. performance trade-off, two simplified chrominance-block bitstream converters are provided next in FIGS. 4 and 5.

FIG. 4 illustrates a simplified chrominance-block bitstream conversion from a 4:2:2 P bitstream to a MP bitstream in accordance with the present invention. In a converter 400, only one motion-compensation unit, namely the chroma MC(2) function 325, is used. This saves ⅔ of the frame-buffer memories compared with the converter 300 of FIG. 3. The filter 340 in FIG. 4 is only applied to chrominance blocks re-constructed from the IDCT function 315, and no clipping is applied in the filtering process.

However, while the converter 400 provides significant reductions in complexity, errors are introduced by this simplification. Three error sources are:

1. removing of chrominance MC(1) and representing the 4:2:2 chroma reference picture in (a) the 4:2:0 format and (b) quantized by the new luma quantizer matrix;
2. changing the position of the filter and clip function blocks, and
3. integer operations of the filtering process.

Since the entire process only involves chrominance, the introduced errors are likely very small since chroma errors are less likely to be perceived in an image.

If, in addition to the above approximations, the errors generated by quantization and clipping can be ignored, the chrominance-block bitstream conversion process given by the converter 400 of FIG. 4 can be approximated by the converter 500 of FIG. 5.

FIG. 5 illustrates an approximated chrominance-block bitstream conversion from a 4:2:2 P bitstream to a MP bitstream in accordance with the present invention. In the converter 500, a motion-compensation unit, namely the chroma MC(3) function 510, is applied to difference (or residue) images. By combining the IDCT function 315, filter 340, and DCT function 350 into one single unit 520, the converter 500 reduces complexity. However, such a structure could introduce color drift.

For the case of 4:2:2 P with 4:2:0 color format bitstreams, the converter can be further simplified as shown in FIG. 6.

FIG. 6 illustrates a chrominance-block bitstream conversion from a 4:2:2 P bitstream with a 4:2:0 color format to a MP bitstream in accordance with the present invention. For the converter 600, an approximation can be made for a low-cost implementation by removing the three dash-line function units: IDCT 315, clip function 335, and DCT function 350.

For luminance blocks, the only needed conversion is the possible DC precision change 382 shown in FIG. 7.

FIG. 7 illustrates a luminance-block bitstream conversion from a 4:2:2 P 4:2:2 or 4:2:0 bitstream to a MP 4:2:0 bitstream when intra_dc_precision=$11_{10}$ in accordance with the present invention. The converter 700 includes the function 382 for setting a new intra_dc_precision value when the value is out of bounds, or based on a user input.

The various cases of the texture converting processes are summarized in Table 5.

FIG. 8 illustrates a combination of a 4:2:2 to 4:2:0 converter and transcoder in accordance with the present invention. The 4:2:2 to 4:2:0 converter 400 given in FIG. 4 can be combined with a normal transcoder to provide a 4:2:2 P to MP transcoder 800. In the transcoder/converter 800, re-quantization function ($Q_2$) 855 provides a different quantization level than $Q_1$, e.g., in response to a rate control signal. A corresponding inverse quantization function $Q_2^{-1}$ 860 is provided. The rate control signal may be generated by a rate control function in a conventional manner to achieve a desired bit rate for the MP bitstream.

Functions 810, 830, 850 and 867 correspond to functions 310, 330, 350 and 367, respectively. Functions 855', 860' and 365' correspond to functions 855, 860 and 365, respectively.

A luma MC function 820 is also provided to provide motion compensation of the luma data in the received bitstream. Note that the MVs are re-used to avoid the need for motion estimation.

Accordingly, it can be seen that the present invention provides a system for converting the color format of a digital video bitstream. The system accounts for the allowable formats of the pre- and—post-conversion bitstreams, including quantizer precision level, and whether luma and chroma data have separate quantization matrices, or share a common quantization matrix. In a particular implementation, an MPEG-2 4:2:2 P bitstream having a color format of 4:2:2 or 4:2:0 (i.e., the pre-conversion bitstream) is converted to a MP bitstream having a color format of 4:2:0 (i.e., the post-conversion bitstream).

Coding efficiencies are achieved by using the luma quantization matrix to re-quantize the chroma data, and re-using luma motion vectors for performing motion compensation of the chroma data.

Further efficiencies can be achieved by representing a 4:2:2 reference picture in a 4:2:0 format for converting inter coded frames.

Further efficiencies can be achieved by changing the position of a pixel downsizing filter and clip function.

Simplifications can also be made for a 4:2:2 P 4:2:0 format pre-conversion bitstream.

An efficient conversion for luma blocks is disclosed when the quantization precision of the pre-conversion bitstream is not compatible with that of the post-conversion bitstream.

A transcoding format converter is also disclosed for achieving a different bit rate in the post-conversion bitstream.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for converting a pre-conversion bitstream having a first format to a post-conversion bitstream having a second format, comprising the steps of:

at least partially decompressing the pre-conversion bitstream to recover chroma data therein in a pixel domain;

recovering quantization matrix data associated with luma data from the pre-conversion bitstream; and re-compressing data corresponding to the recovered chroma data;

said re-compressing including re-quantizing of the data corresponding to the recovered chroma data according to the recovered luma quantization matrix to provide said post-conversion bitstream.

2. The method of claim 1, wherein said pre-conversion bitstream comprises inter coded images, and said recovered chroma data has a first chroma format that corresponds to said first format of said pre-converted bitstream, comprising the further steps of:

recovering motion vectors associated with the luma data from the pre-conversion bitstream;

using the recovered luma motion vectors to perform first motion compensation processing of the recovered chroma data for the inter-coded images;

said first motion compensation processing using said first chroma format;

filtering the chroma data after said first motion compensation processing to provide chroma data that has a second chroma format that corresponds to said second format of said post-conversion bitstream; and using the recovered luma motion vectors to perform second motion compensation processing of the chroma data with the second chroma format to provide said data for said re-compressing step.

3. The method of claim 2, wherein:

with said second chroma format, one chroma block is provided for at least every two chroma blocks in said first chroma format.

4. The method of claim 2, wherein:

data corresponding to the chroma data with the second chroma format provided by said filtering step is transformed from a pixel domain to a transform domain, then quantized, then inverse quantized and then inverse transformed to provide data for said second motion compensation processing.

5. The method of claim 1, comprising the further steps of:

recovering a first quantization precision level from the pre-conversion bitstream; and if said first quantization precision level is greater than a maximum allowed precision level of the second format of the post-conversion bitstream:
   (i) lowering the first quantization precision level,
   (ii) recovering DC luma transform data from the pre-conversion bitstream, and
   (iii) re-quantizing data corresponding to the recovered DC luma transform data according to the lowered quantization precision level.

6. The method of claim 1, wherein said pre-conversion bitstream comprises inter coded images, and said recovered chroma data has a first chroma format that corresponds to said first format of said pre-converted bitstream, comprising the further steps of:

filtering the recovered chroma data to provide residue chroma data that has a second chroma format that corresponds to said second format of said post-conversion bitstream;

recovering motion vectors associated with the luma data from the pre-conversion bitstream; and using the recovered luma motion vectors to perform motion compensation processing of data corresponding to the residue chroma data for the inter-coded images to provide said data for said re-compressing step;

wherein said motion compensation processing uses said second chroma format.

7. The method of claim 6, wherein:

with said second chroma format, one chroma block is provided for at least every two chroma blocks in said first chroma format.

8. The method of claim 1, wherein:

said first format comprises a 4:2:2 color format, and said second format comprises a 4:2:0 color format.

9. The method of claim 1, wherein:

said first format comprises an MPEG 4:2:2 Profile format, and said second format comprises an MPEG Main Profile format.

10. The method of claim 1, wherein:

a coded block pattern of the pre-conversion bitstream is modified for use in the post-conversion bitstream.

11. The method of claim 1, wherein:

the pre-conversion bitstream and the post-conversion bitstream use the same macroblock coding type.

12. The method of claim 1, wherein:

said re-quantization step is responsive to a rate control signal for setting a bit rate of the post-conversion bitstream.

13. The method of claim 1, wherein:

the recovered luma quantization matrix is modified to improve coding efficiency of said post-conversion bitstream.

14. An apparatus for converting a pre-conversion bitstream having a first format to a post-conversion bitstream having a second format, comprising:

means for at least partially decompressing the pre-conversion bitstream to recover chroma data therein in a pixel domain;

means for recovering quantization matrix data associated with luma data from the pre-conversion bitstream; and means for re-compressing data corresponding to the recovered chroma data, including means for re-quantizing the data corresponding to the recovered chroma data according to the recovered luma quantization matrix to provide said post-conversion bitstream.

15. The apparatus of claim 14, wherein said pre-conversion bitstream comprises inter coded images, and said recovered chroma data has a first chroma format that corresponds to said first format of said pre-converted bitstream, further comprising:

means for recovering motion vectors associated with the luma data from the pre-conversion bitstream;

means for using the recovered luma motion vectors to perform first motion compensation processing of the recovered chroma data for the inter-coded images;

said first motion compensation processing using said first chroma format;

a filter for filtering the chroma data after said first motion compensation processing to provide chroma data that has a second chroma format that corresponds to said second format of said post-conversion bitstream; and means for using the recovered luma motion vectors to perform second motion compensation processing of the chroma data with the second chroma format to provide said data for said re-compressing means.

16. The apparatus of claim 15, wherein:

with said second chroma format, one chroma block is provided for at least every two chroma blocks in said first chroma format.

17. The apparatus of claim 15, wherein:

data corresponding to the chroma data with the second chroma format provided by said filter is transformed from a pixel domain to a transform domain, then quantized, then inverse quantized and then inverse transformed to provide data for said second motion compensation processing.

18. The apparatus of claim 14, further comprising:

means for recovering a first quantization precision level from the pre-conversion bitstream; and means for: (i) lowering the first quantization precision level, (ii) recovering DC luma transform data from the pre-conversion bitstream, and (iii) re-quantizing data corresponding to the recovered DC luma transform data according to the lowered quantization precision level, if said first quantization precision level is greater than a maximum allowed precision level of the second format of the post-conversion bitstream.

19. The apparatus of claim 14, wherein said pre-conversion bitstream comprises inter coded images, and said recovered chroma data has a first chroma format that corresponds to said first format of said pre-converted bitstream, further comprising:

a filter for filtering the recovered chroma data to provide residue chroma data that has a second chroma format that corresponds to said second format of said post-conversion bitstream;

means for recovering motion vectors associated with the luma data from the pre-conversion bitstream; and mans for using the recovered luma motion vectors to perform motion compensation processing of data corresponding to the residue chroma data for the inter-coded images to provide said data for said re-compressing means;

wherein said motion compensation processing uses said second chroma format.

20. The apparatus of claim 19, wherein:

with said second chroma format, one chroma block is provided for at least every two chroma blocks in said first chroma format.

21. The apparatus of claim 14, wherein:

said first format comprises a 4:2:2 color format, and said second format comprises a 4:2:0 color format.

22. The apparatus of claim 14, wherein:

said first format comprises an MPEG 4:2:2 Profile format, and said second format comprises an MPEG Main Profile format.

23. The apparatus of claim 14, wherein:

a coded block pattern of the pre-conversion bitstream is modified for use in the post-conversion bitstream.

24. The apparatus of claim 14, wherein:

the pre-conversion bitstream and the post-conversion bitstream use the same macroblock coding type.

25. The apparatus of claim 14, wherein:

said re-quantization means is responsive to a rate control signal for setting a bit rate of the post-conversion bitstream.

26. The apparatus of claim 14, wherein:

the recovered luma quantization matrix is modified to improve coding efficiency of said post-conversion bitstream.

* * * * *